United States Patent [19]
Busch et al.

[11] Patent Number: 5,926,087
[45] Date of Patent: Jul. 20, 1999

[54] VISOR PARAMETER MONITOR AND DISPLAY

[75] Inventors: David B. Busch; Mark L. Zeinstra, both of Holland; James P. Robillard, Zeeland; William J. Fluharty, Holland, all of Mich.

[73] Assignee: Prince Corporation, Holland, Mich.

[21] Appl. No.: 08/995,450

[22] Filed: Dec. 22, 1997

[51] Int. Cl.⁶ .................................................. B60Q 1/00
[52] U.S. Cl. ..................... 340/438; 340/442; 340/447; 340/461
[58] Field of Search ................................. 340/438, 442, 340/447, 425.5, 461; 296/97.1

[56] References Cited

U.S. PATENT DOCUMENTS

| | | | |
|---|---|---|---|
| D. 366,440 | 1/1996 | Tong | D12/191 |
| 4,056,696 | 11/1977 | Meyerle et al. | 179/100 R |
| 4,247,850 | 1/1981 | Marcus | 340/694 |
| 4,687,072 | 8/1987 | Komuro | 180/219 |
| 4,706,273 | 11/1987 | Spear et al. | 379/58 |
| 4,912,607 | 3/1990 | Kocsi et al. | 362/80.1 |
| 5,430,965 | 7/1995 | Lai | 40/597 |
| 5,661,651 | 8/1997 | Geschke et al. | 364/424.03 |
| 5,661,804 | 8/1997 | Dykema et al. | 380/21 |

*Primary Examiner*—Daniel J. Wu
*Assistant Examiner*—Ashok Mannava
*Attorney, Agent, or Firm*—Price, Heneveld, Cooper, DeWitt & Litton

[57] ABSTRACT

A tire pressure monitor is incorporated in a module mounted within a vehicle visor for ready accessibility and visibility by the vehicle operator. The monitor includes a light display extending on a first side of the visor which faces the vehicle operator when the visor is in a raised stored position against the vehicle headliner. A more detailed display is located on the opposite side of the visor for providing an indication to the vehicle operator as to which tire is low in pressure and the pressure of each of the tires.

23 Claims, 3 Drawing Sheets

VISOR PARAMETER MONITOR AND DISPLAY

BACKGROUND OF THE INVENTION

The present invention relates to a vehicle parameter monitoring system and particularly to a tire pressure monitoring system which provides multiple displays conveniently located in a vehicle visor.

With the advent of new tire designs, tires infrequently lose tire pressure. Coupled with the inconvenience of checking tire pressure at self-service stations, which frequently charge for use of air facilities located at a remote location at such stations, the careful monitoring of tire pressure by vehicle owners and operators has become less frequent. The result is that frequently vehicles are operated with low tire pressure. This is not only potentially a safety problem with vehicles being operated with one or more tires having low pressure but also increases the cost to operate the vehicle due to lower fuel milage and increased wear on the tires. Thus, it is desirable to provide an operator with a system by which the operator can monitor the pressure of the tires of the vehicle within the vehicle itself so that, in the event the pressure in one or more tires falls below a predetermined threshold, the vehicle operator is alerted to such condition and can take corrective action by either adding air to the tires for proper inflation or having the tire or tire stem repaired, if necessary.

One such tire pressure monitor is represented by U.S. Pat. No. 5,661,651 entitled WIRELESS VEHICLE PARAMETER MONITORING SYSTEM, which issued Aug. 26, 1997, to the present assignee. This system provides for the transmission of radio frequency signals carrying information representative of tire pressure and transmitting such information to a vehicle receiver coupled to a circuit for displaying the decoded pressure indication information transmitted from each of the vehicle tires. The pressure information is then selectively available to the vehicle operator through a message center typically located in the overhead console or in the instrument panel. Although the message center can take on a number of different forms, it is desired to provide a system which is operator friendly in that it alerts the operator to the existence of a problem and subsequently allows the operator to seek additional information as to the source and nature of the problem.

SUMMARY OF THE PRESENT INVENTION

The system of the present invention improves upon the basic tire pressure monitoring system of the prior art by providing the operator with a conveniently located display of information which can alert the driver to a sensed parameter falling outside desired limits by initially providing an readily visible and easily identifiable alarm such as an indicator light and subsequently provides circuit means which is operator interactive, allowing the operator to interrogate the monitoring system for more specific information regarding the parameter and its status. In a preferred embodiment of the invention, the system is particularly adapted for use in connection with a tire pressure monitor and is incorporated in a module uniquely mounted within a vehicle visor for ready accessibility and visibility by the vehicle operator. In one embodiment of the invention, the monitoring system includes a light display extending on a first side of the visor which faces the vehicle operator when the visor is in its normal stored position against the vehicle headliner and a more detailed display located on the opposite side of the visor for providing an indication to the vehicle operator as to which tire is low in pressure, and, in a further preferred embodiment of the invention, the pressure of each of the tires.

With such a system, therefore, the vehicle operator is alerted to a parameter falling outside a prescribed limit, such as low tire pressure, initially by an indicator light conveniently located in a visor which can be moved to a lowered position to expose a more detailed display of sensed parameter information. This allows the tire pressure monitoring system to be located remotely from other display information which provides the operator with a more focused perception of a tire or other sensed parameter problem, isolating it from the myriad of instrument panel displays typically associated with vehicles. As a result, it is more likely that the vehicle operator will notice and utilize the tire pressure monitor when conveniently located, in the preferred embodiment, in a visor. These and other features, objects and advantages of the present invention will become apparent upon reading the following description thereof together with reference to the accompanying drawings.

DETAILED DESCRIPTION OF THE PREFERRED EMBODIMENT

Figure 1:
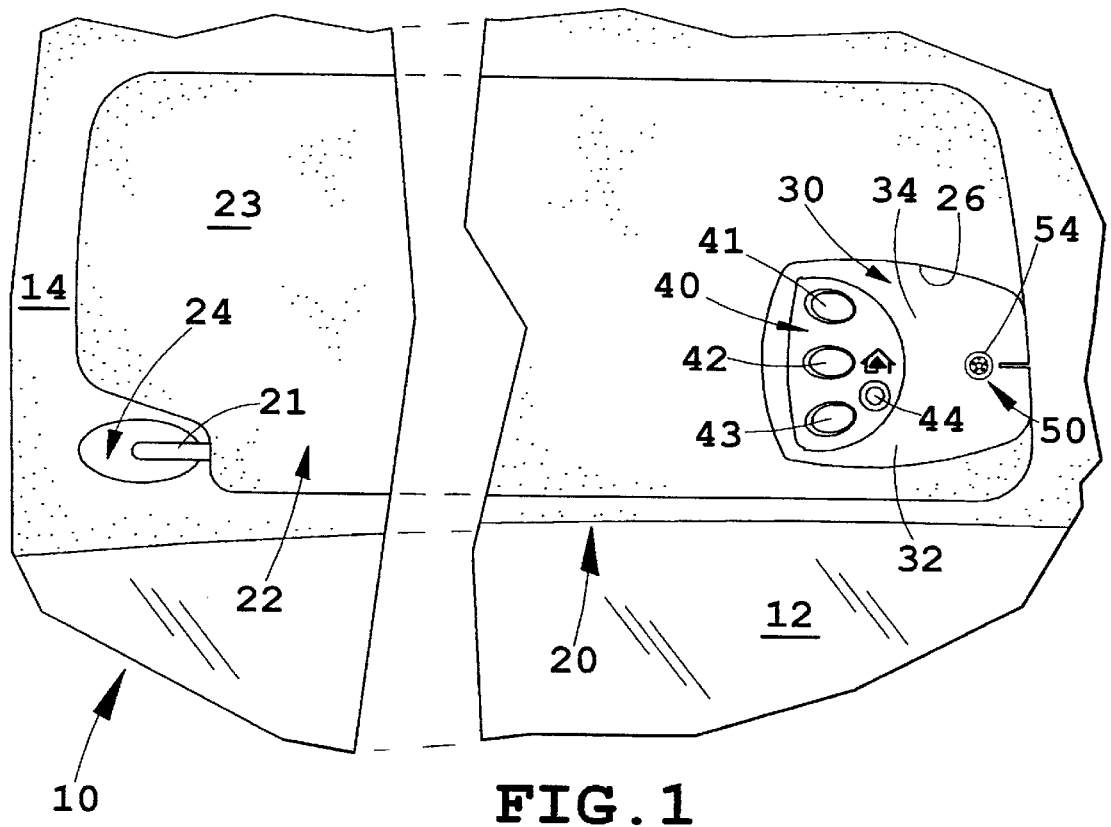
FIG. 1 is a fragmentary perspective view of a visor embodying the parameter sensing monitor system of the present invention, shown in a first use position, raised and stored against the vehicle headliner.
Figure 2:
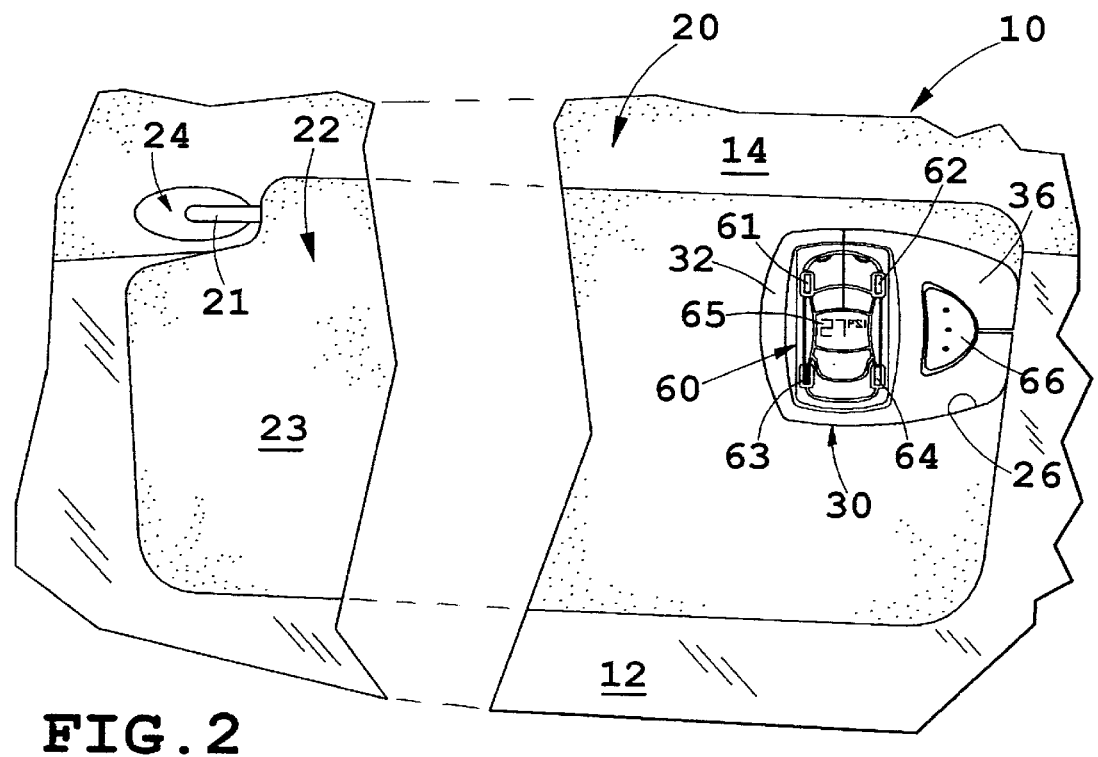
FIG. 2 is a fragmentary perspective view of the visor shown in FIG. 1, shown in a lowered second use position, exposing the opposite side of the monitoring system of the present invention.

Referring initially to FIGS. 1 and 2, there is shown a vehicle 10, such as an automobile, including a front windshield 12 extending to the roof which is covered by a molded headliner 14 providing a decorative interior finish for the roof area of the vehicle. Shown in FIGS. 1 and 2 is the driver's side area of the windshield and headliner to which a visor assembly 20 is mounted. The visor assembly includes a visor body 22 to which a parameter monitoring module 30 embodying the present invention is mounted at the lower right corner as viewed in FIG. 1 when the visor is in a raised stored position as seen in that figure. The visor body 22 is mounted to the underlying sheet metal support of the roof by means of a conventional bracket assembly 24 which allows the visor to pivot from the raised stored position shown in FIG. 1 to a first lowered use position shown in FIG. 2 and subsequently pivoted to a side window position if desired. The visor body 22 can be made of a molded polymeric material, such as polypropylene, in a butterfly core construction and covered by a suitable upholstery material 23 conforming the visor to the interior decor of the vehicle. Alternately, the core may be made of a fiberboard, foam core or of other suitable construction which includes a cutout 26 for receiving the parameter monitoring and display module 30.

Module 30 includes a housing 32 preferably molded of a polymeric material, such as polycarbonate, and has a first side 34 exposed when the visor is in a raised stored position, as shown in FIG. 1, and a second side 36 exposed when the visor is in a lowered use position, as shown in FIG. 2. The cutout or recess 26 extends entirely through the visor body and defines a pocket for receiving module 30 which can be attached to the edges of the recess 26 in a conventional manner such as by a bonding adhesive, tabs extending from housing 32 into the visor core for anchoring the housing, an attachment bezel or other fastening structure. The pivot rod assembly 24 includes a hollow pivot rod 21 for receiving a pair of electrical conductors therein in a conventional manner, which extend to the module 30 for supplying operating power thereto.

Figure 3:
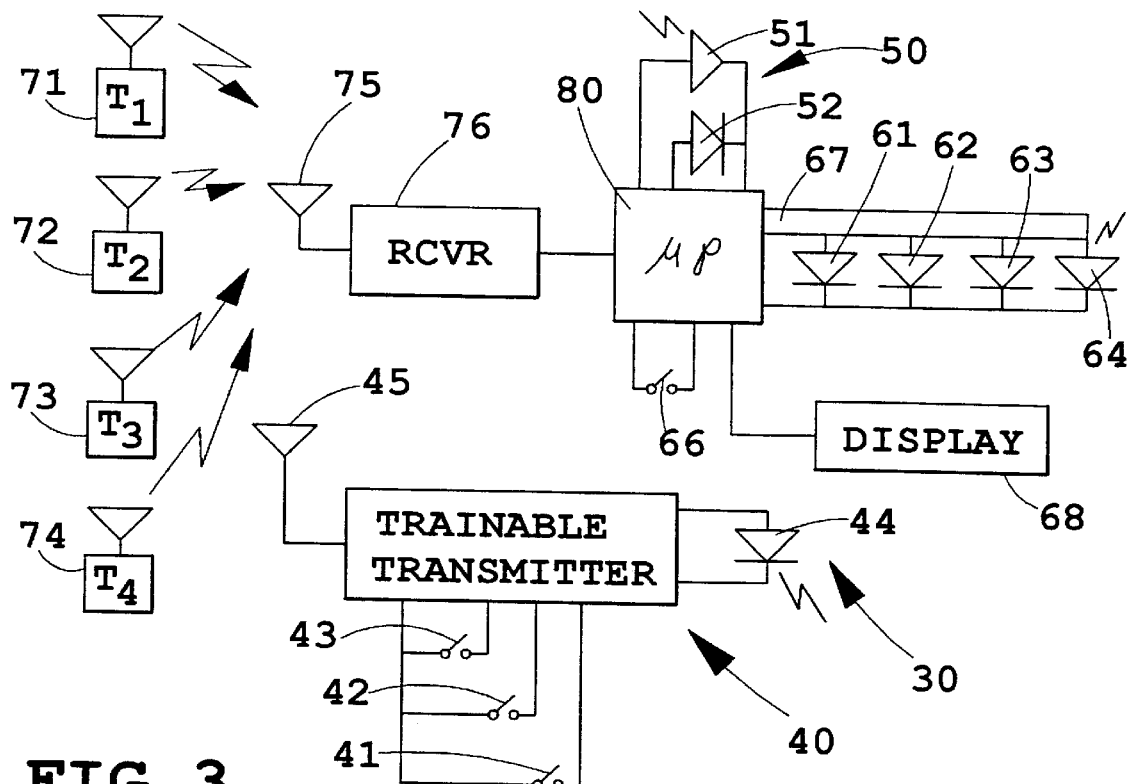
FIG. 3 is an electrical circuit diagram in block and schematic arm of the visor mounted vehicle parameter sensor and trainable transmitter incorporated in the visor shown in FIGS. 1 and 2.

Mounted on the first side 4 of module 30 is a HomeLink® trainable transmitter module 40, which can be of the construction described in U.S. Pat. No. 5,661,804, entitled TRAINABLE TRANSMITTER CAPABLE OF LEARNING VARIABLE CODES, which issued on Aug. 26, 1997, the disclosure of which is incorporated herein by reference. Basically, the trainable transmitter is capable of learning the RF frequency, modulation scheme and coding information for up to three separate existing transmitters, such that any one of three push button switches 41, 42 or 43 can be actuated for operating up to three different garage doors or three different items to be controlled including, for example, security gates, home lighting, home security or the like. The trainable transmitter 40 also includes an LED 44 for use in training the transmitter in a manner described in the above-identified '804 patent. As seen in FIG. 3, the trainable transmitter 40 also integrally includes an antenna 45 for receiving signals from transmitters to which it is to be trained and for subsequently retransmitting the learned RF signals.

Module 30 further includes the parameter monitor and display system also seen in FIG. 3 and which includes at least a two-color LED 50 comprising, as seen in FIG. 3, an amber LED 51 and a red LED 52 in a single package and mounted to be exposed from the first surface 34 when the visor is in a raised stored position, as seen in FIG. 1. The packaged LEDs 50 may be surrounded by an icon 54 representative of a wheel design with the hub of the wheel comprising the multicolored LED package to inform the driver that the indicator is for providing a tire pressure warning.

Module 30 also includes, on the second side 36, an icon 60 as part of a display area showing a plan schematic view of a vehicle with a left front tire 61, right front tire 62, left rear tire 63 and right rear tire 64. In the center area 65 of the vehicle icon 60 is provided a dot matrix display 68 (FIG. 3) which, as described below in detail in connection with FIG. 3, displays the tire pressure sequentially for each of the four vehicle tires. Adjacent icon 60 is a push button interrogation switch 66 for activating the monitor and display circuit to sequentially display the pressure of the tire which is illuminated by an LED associated with the left front, right front, left rear, right rear tires on the vehicle icon 60. Thus, with the system shown in FIGS. 1 and 2, the visor, when it is in its normal stored position, has available for use by the vehicle operator the garage door opening transmitter 40 and a single visual display indicator 50 for indicating when a tire pressure has fallen below first and second predetermined limits. On the opposite side when the visor is in the lowered position, the display 60 provides the vehicle operator with an indication of which one or more of the four tires has a low pressure condition and selectively displays the pressure for the vehicle operator upon activation of switch 66. The circuit associated with the tire pressure monitor and display 30 is now described in connection with the diagram of FIG. 3.

The tire pressure monitor circuit can be generally of the type disclosed in the above-identified U.S. Pat. No. 5,661,651, which includes tire mounted transmitters 71, 72, 73 and 74, each with an associated antenna for transmitting signals to a receiving antenna 75 of receiver 76. These transmitters transmit a different carrier frequency for each tire and one which is variable as a function of the detected tire pressure. The details of the demodulation scheme for providing such information is disclosed in detail in the '651 patent, the disclosure of which is incorporated herein by reference. The receiver 76 provides tire identification information as well as the tire pressure information to microprocessor 80 to initially activate LED assembly 50. Thus, either the amber or red LED 51, 52, respectively, is activated when any one of the four tires falls below a first or second predetermined low pressure condition. The amber LED 51 may be illuminated, for example, when the pressure of a tire reaches 25 psi, while the red LED 52 may be activated if the tire pressure has fallen to 20 psi, indicating a more serious condition.

Microprocessor 80 is also coupled to each of the tire display LEDs 61, 62, 63 and 64 associated with icon 60 on the reverse side of visor body 22. Each of these LEDs 61–64 are packaged three-color LEDs and are coupled by a bus 67 from microprocessor 80, providing three lines of information for each of the LEDs such that they can be illuminated green for normal pressure, amber for pressure fallen below the first threshold level and red if the pressure falls below a second pressure level. The activation of momentary push button interrogation switch 66 effects a sequence in the microprocessor as described in connection with FIG. 4 below to sequentially test each of the four tires, illuminating the proper LED for each of the triple LED displays 61–64 and simultaneously display the actual pressure in pounds per square inch on the dot matrix display 68.

Figure 4:
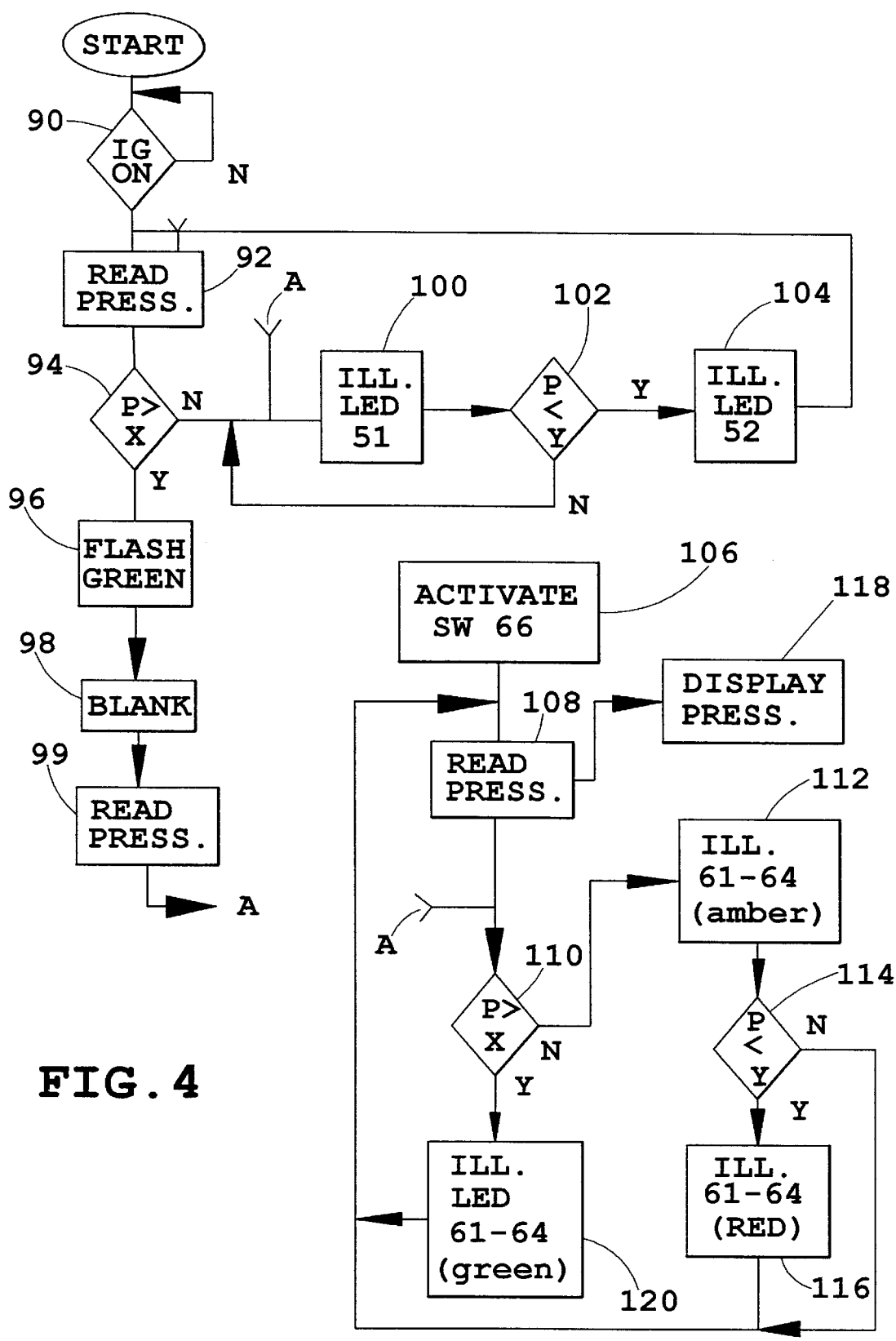
FIG. 4 is a flow diagram for the programming of the microprocessor shown in FIG. 3 for a typical sequence of operation of the system shown in FIGS. 1–3.

The operation of the microprocessor in association with the displays 50, 61–64 and 68 is now described in connection with the flow diagram of FIG. 4. The receiver actively monitors and stores tire pressure signals from the wheel transmitters 71–74 even when the ignition is off. Upon power up after initialization of the program, the "ignition on" condition is detected as indicated by block 90. The stored tire pressure received from each of the transmitters 71–74 is read as indicated by block 92. The program then tests to determine if the pressure is above threshold one (X) as indicated by block 94, and, if the pressure is above the first threshold indicating normal tire pressure in each of the tires, the green LED of each of the LEDs 61–64 are flashed as indicated by block 96. Displays 61–64 and 68 are then blanked as indicated by block 98. In the event, however, at block 94, one or more of the tires have a pressure below the first threshold "X" as indicated by a negative test at block 94, the amber LED 51 is activated on display 50 and remains continuously on as indicated by block 100. The program then tests to see if the pressure has fallen below the second threshold "Y", such as 20 psi, as indicated at block 102 and, if not, the LED 51 remains illuminated since the pressure is not above the first threshold. If the pressure, however, is below the second threshold, the program then causes the microprocessor to activate the red LED 52 as indicated by block 104, which remains on in a flashing mode until the problem has been corrected.

At this time with either the LED 51 activated or LED 52 flashing, the operator will be alerted to lower the visor into the position shown in FIG. 2 and activate the interrogation switch 66 as indicated by block 106, which sequentially reads the pressure on each of the four tires as indicated by block 108. If the pressure is greater than the first threshold (i.e. 25 psi) as indicated by block 110, the program continues to read the rest of the four tires until it detects the low pressure, at which time it goes to block 112 activating the amber one of the LEDs 61–64 associated with the tire being tested in the sequence. The program simultaneously tests, as indicated by block 114, whether the detected tire pressure is below "Y" (the second predetermined level) and, if it is, flashes the associated red one of the LEDs 61–64. At the same time, the pressure information read at block 108 effects the sequential display of the pressure as indicated by block 118 of the associated illuminated tire in the vehicle icon shown in FIG. 2 as indicated by block 116 such that the vehicle operator can determine not only which tire has a low pressure condition but the exact pressure of the tire. The program, thus, cycles through the loop and when the tire pressure for each of the tires is again greater than the first threshold level "X", all of the LEDs are deactivated. The operator, however, can test the actual pressure in each of the tires at any time desired by activation of switch 66, which effects the reading of pressure block 108 and display of sequential pressure at block 118. When, however, the pressure is above the first predetermined first threshold "X", the green LEDs 61–64 associated with each of the four tires being sequentially read is illuminated by block 120.

The program includes an internal clock to provide a timer for the sequential display of each of the tires, which can be selected for any convenient time interval such as 3 seconds or the like per tire, providing the operator sufficient time to identify which tire is illuminated with either a green, amber or red flashing light on the icon 60 in FIG. 2 and the associated pressure of the identified tire location in display area 65. It is noted that in the program after the blanking step 98 after the ignition is first turned on, the program continuously reads the tire pressures as indicated by block 99 and, in the event the pressure falls below the first threshold "X", enters the sequence at block 100 as indicated by port connection A in FIG. 4 to alert the operator with the visor in a raised condition. At the same time in the event the visor is in the lowered position, even with switch 66 not actuated by the operator, one of the LEDs associated with a given tire having a low pressure is activated by the sequence beginning at block 110. Thus, regardless of the visor position, in the event a low tire pressure condition exists, either the LED 51 or 52 will be illuminated, or the LEDs 61–64 associated with the low tire pressure will be illuminated. If desired, instead of sequencing through each tire and pressure display automatically, the program can be modified to allow the operator to manually sequence through the pressure displays by successive activations of switch 66.

Figure 5:
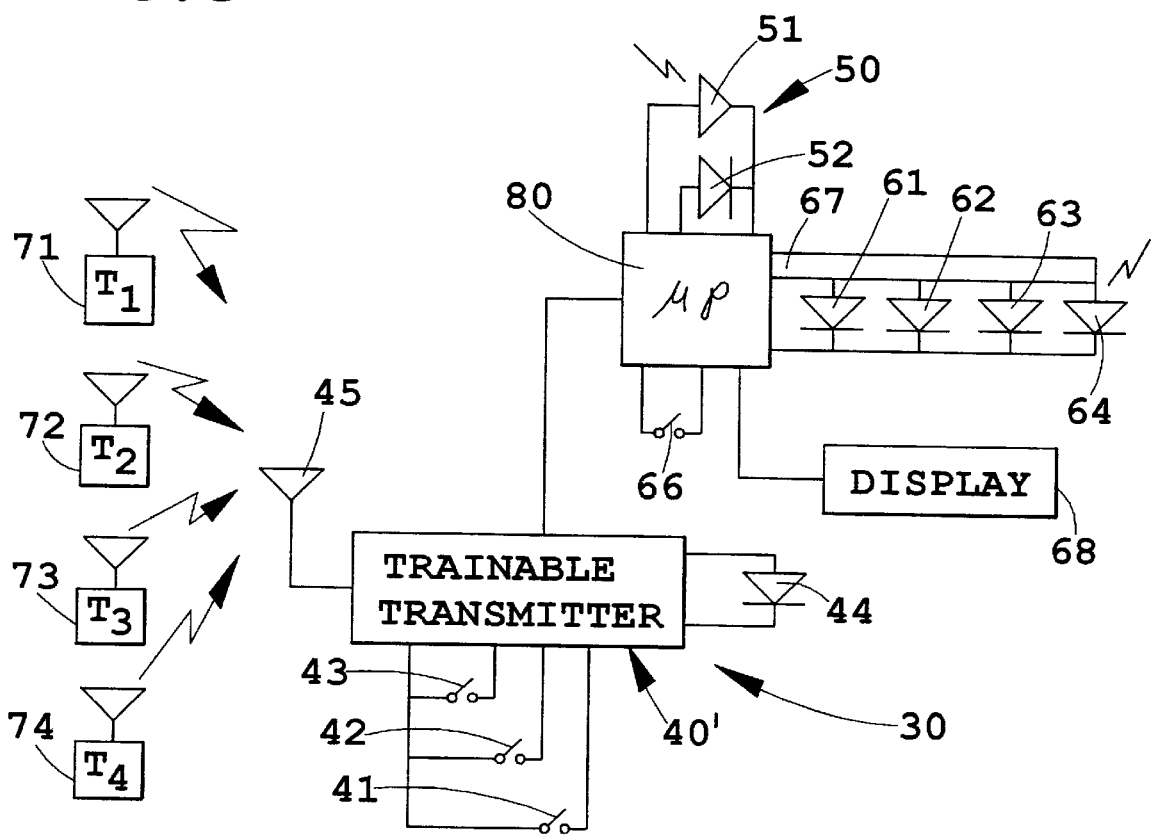
FIG. 5 is an alternative embodiment of the electrical circuit which can be employed in connection with the parameter sensing and monitoring system of the present invention.

In FIG. 5, an alternative embodiment of the invention is shown wherein the receiver 76 of the FIG. 3 embodiment is replaced with the receiver section of the HomeLink® trainable transmitter 40, which includes four additional trainable channels for use with each of the transmitters 71–74. In FIG. 5, the trainable transmitter is identified by 40' and can be of the same construction as that disclosed in the above-identified U.S. Pat. No. 5,661,651 to effect such dual functioning of the trainable transmitter.

In some embodiments, it may be desired to eliminate the display 68, in which case LEDs 61–64 will provide information sufficient for purposes of alerting the vehicle operator to the nature of a low tire condition. Preferably, however, the display 68 is employed for displaying the actual pressure of each of the tires identified by the sequential activation of LEDs 61–64 on the vehicle icon 60 shown in FIG. 2.

It will become apparent to those skilled in the art that various modifications to the preferred embodiment of the invention as described herein can be made without departing from the spirit or scope of the invention as defined by the appended claims.

The invention claimed is:

1. A vehicle visor mounted tire pressure monitor and display system comprising:
   a visor body having first and second sides; and
   a monitor and display module mounted to said visor body, said module having an indicator on said first side of said visor to be exposed when said visor body is in a raised stored position, said indicator actuated when the pressure of a tire is below a predetermined level, said module including a numerical display indicator on said second side of said visor facing the vehicle operator when said visor body is in a lowered use position for displaying the pressure of a vehicle tire wheich is below said predetermined level.

2. A vehicle visor mounted parameter monitor and display system comprising:
   a visor body; and
   a monitor and display module mounted to said visor body, said module having a first side with a first display indicator exposed when said visor body is in a raised stored position and a second side with a second display indicator facing the vehicle operator when said visor body is in a lowered use position, wherein said first display indicator comprises an indicator light and said second display indicator includes a numerical display, and wherein said module monitors the pressure in each tire of a vehicle.

3. The system as defined in claim 2 wherein said second display includes an icon indicating the location of each tire and an indicator light associated with each tire location.

4. The system as defined in claim 3 wherein said module includes a control circuit including a switch which is operator actuated for sequentially displaying the tire pressure by said numeric display corresponding to each of said tire locations as said indicator light associated with said tire location is illuminated.

5. The system as defined in claim 4 wherein said first display indicator comprises at least an amber and a red LED coupled to said control circuit.

6. The system as defined in claim 5 wherein said numerical display comprises a dot matrix display.

7. The system as defined in claim 6 wherein said monitor includes an RF receiver for receiving tire pressure information to be displayed.

8. A vehicle visor including a tire pressure display comprising:
   a visor body;
   a source of tire pressure information signals; and
   a display module mounted to said visor body, said display module coupled to said source for displaying tire pressure information, said module having a first side with a display indicator exposed when said visor body is in a raised stored position and a second side having a vehicle icon thereon showing the location of each vehicle tire and an indicator light for each tire location, said second side facing the vehicle operator when said visor body is in a lowered use position.

9. The display as defined in claim 8 wherein said second side of said module includes a numerical display.

10. The display as defined in claim 9 wherein said display indicator is a two-color LED for displaying two different tire conditions.

11. The display as defined in claim 10 wherein said module includes a control circuit for sequentially displaying the tire pressure by said numerical display corresponding to each of said tire locations as said indicator light associated with each tire location is illuminated.

12. The display as defined in claim 11 wherein said display indicator comprises at least an amber and a red LED coupled to said control circuit.

13. The display as defined in claim 12 wherein said numerical display is positioned in a center area of said vehicle icon.

14. The display as defined in claim 8 wherein said module further includes an RF trainable transceiver.

15. The display as defined in claim 14 wherein said transceiver receives tire pressure information from individual tire pressure transmitters associated with each tire.

16. A vehicle visor mounted parameter monitor and display system comprising:

a source of signal information representing a vehicle operating parameter;

a visor body; and a monitor and display module coupled to said source and mounted to said visor body, said display module having a first side exposed when said visor body is in a raised stored position and a second side facing the vehicle operator when said visor body is in a lowered use position; wherein said first side of said module includes an indicator activated when a detected vehicle parameter is out of a desired range and said second side of said module includes a selectable display for displaying detailed information regarding the detected vehicle parameter.

17. The system as defined in claim 16 wherein said source includes a receiver for receiving tire pressure information to be displayed.

18. The system as defined in claim 17 wherein said indicator comprises an indicator light.

19. The system as defined in claim 18 wherein said indicator light comprises at least an amber and a red LED.

20. The system as defined in claim 16 wherein said selectable display includes a numerical display.

21. The system as defined in claim 20 wherein said module monitors the pressure in each tire of a vehicle.

22. The system as defined in claim 21 wherein said selectable display includes an icon indicating the location of each tire and lights associated with each tire location.

23. The system as defined in claim 22 wherein said module includes a control circuit for sequentially displaying the tire pressure by said numeric display corresponding to each of said tire locations as a light associated with said tire location is illuminated.

\* \* \* \* \*